US 9,563,880 B2

(12) United States Patent
Longobardi

(10) Patent No.: US 9,563,880 B2
(45) Date of Patent: Feb. 7, 2017

(54) LOCATION AWARE PERSONAL SCHEDULER

(75) Inventor: Roberto Longobardi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 2627 days.

(21) Appl. No.: 11/375,467

(22) Filed: Mar. 14, 2006

(65) Prior Publication Data
US 2006/0225076 A1    Oct. 5, 2006

(30) Foreign Application Priority Data
Mar. 29, 2005   (EP) .................................. 05102459

(51) Int. Cl.
*H04W 4/02*    (2009.01)
*G06Q 10/10*   (2012.01)
*G06Q 10/06*   (2012.01)

(52) U.S. Cl.
CPC ............ *G06Q 10/109* (2013.01); *G06Q 10/06* (2013.01)

(58) Field of Classification Search
CPC .................................................. G06Q 10/109
USPC ............................................................. 705/7.13
See application file for complete search history.

(56) References Cited

U.S. PATENT DOCUMENTS

| 6,446,004 B1* | 9/2002 | Cao et al. ..................... 701/482 |
| 2003/0224762 A1* | 12/2003 | Lau ..................... G06Q 10/109 455/412.2 |
| 2004/0230685 A1* | 11/2004 | Seligmann ............. G01C 21/00 709/228 |
| 2005/0030160 A1* | 2/2005 | Goren et al. ................. 340/10.5 |
| 2006/0058948 A1* | 3/2006 | Blass et al. .................... 701/207 |
| 2006/0085177 A1* | 4/2006 | Toyama et al. ................. 703/22 |

FOREIGN PATENT DOCUMENTS

WO         WO 0104577 A1 *   1/2001

OTHER PUBLICATIONS

The Magazine of Popular Science and Journal of the Useful Arts, vol. 1, 1836.*
Marilyn vos Savant, The Power of Logical Thinking: Easy Lesson in the Art of Reasoning . . . and Hard Facts About its Absence in Our Lives, Macmillan, 1997.*

* cited by examiner

*Primary Examiner* — Romain Jeanty
*Assistant Examiner* — Nadja Chong Cruz
(74) *Attorney, Agent, or Firm* — Yee & Associates, P.C.; Richard A. Wilhelm

(57) ABSTRACT

A personal scheduler is proposed. The scheduler is used to define tasks, each one consisting of an activity to be performed by a defined deadline at a specific location, and appointments, each one consisting of an activity to be performed at a precise time at a specific location. The scheduler warns the user whenever s/he passes close to the location of each task. Moreover, at the morning the scheduler reminds all the tasks that might be performed during the day, according to an expected traveling path of the user based on the appointments to be attended.

17 Claims, 8 Drawing Sheets

LOCATION AWARE PERSONAL SCHEDULER

TECHNICAL FIELD

The present invention relates to the data processing field. More specifically, the present invention relates to a solution based on a mobile data processing device for aiding a user to organize tasks.

BACKGROUND ART

Several mobile data processing devices have been proposed in the last years for aiding a user to perform a number of activities. For example, so-called organizers have become very popular for specific applications; typically, these devices are used as a phone book, a calendar, an alarm clock, a scheduler, and the like.

Considering in particular the scheduler, the organizer is very useful for managing a personal agenda of a corresponding user. For this purpose, the scheduler allows the user to define different types of activities to be performed. Typical examples are tasks without specific time constraints (i.e., which may be executed at any time, generally within a defined deadline); generally, the tasks are location-dependent, that is, they must be performed at specific locations (such as an office, a shop, and the like).

Most of the schedulers known in the art provide different functions for remembering the tasks to be performed to the user. Typically, the scheduler warns the user when the deadline of each task is approaching (for example, some days before); moreover, the scheduler continues remembering the task periodically (for example, every 1-2 hours) until it has been completed.

However, the available solutions are not completely satisfactory. Indeed, the user generally forgets the tasks to be performed until the corresponding deadlines are very close (when the organizer remembers them). Moreover, it might now be difficult (if not impossible) to perform some task; a typical example is when the user is far away from the corresponding location, or when the task is remembered during a holiday period. Moreover, the user can be very busy at the moment. A worst situation arises if the user is away (for example, for a trip) and s/he is then unable to perform the task by its deadline.

All of the above is even more frustrating if the user had passed several times close to locations where the tasks were to be performed in the preceding days (without realizing that s/he could have done the tasks at that moment).

Another problem arises when the tasks require some prerequisites for their execution (such as carrying a document, having specific information available, and the like). In this case, even if the user had remembered the tasks when around their locations it would have been very unlike that s/he had all the required documents or information.

The above-described drawbacks cause a substantial waste of time for the user. Moreover, in some cases they can even result in the missing of some tasks (with the corresponding negative consequences).

SUMMARY OF THE INVENTION

According to the present invention, the idea of organizing tasks according to the position of the user is suggested.

Particularly, an aspect of the invention provides a method for aiding a user to organize tasks; each task is suitable to be performed by the user at a predefined set of (one or more) locations. The user is associated with a mobile device (for example, an organizer). The method includes the step of monitoring the position of the device. The user is then warned when the position of the device approaches one or more locations.

The proposed solution remembers the tasks to the user whenever they can be actually performed. This avoids forgetting the tasks until their deadlines are approaching. As a result, the risk of having difficulties in performing the tasks (for example, because of a holiday period, a busy condition, or a trip) is strongly reduced (if not avoided at all).

More specifically, in this way the tasks are remembered to the user exactly when s/he is passing close to their locations. Therefore, the tasks can be generally performed easily when it is more convenient.

All of the above results in a substantial saving of time. Even more important, the devised solution strongly reduces the risk of missing some tasks (with the corresponding negative consequences).

In a preferred embodiment of the invention, the location of some tasks is defined by selecting an entity (such as a shop or a person), which is then resolved into the corresponding location.

This feature facilitates the specification of the tasks.

In addition or in alternative, some tasks are associated with a category of entities (such as pharmacies or plumbers), which is then resolved into one or more locations of the corresponding entities.

The proposed solution adds further flexibility to the specification of the tasks.

A preferred implementation of the invention is based on the comparison of a distance (of the locations of the tasks from the position of the device) with a threshold value.

This algorithm is very simple but at the same time effective.

A way to further improve the solution is to set the threshold value for each location according to a probability of passing in an area around it (which probability is estimated from a set of preceding positions of the device).

As a result, it is possible to define the threshold value automatically (taking into account how often the user passes close to the location).

As an additional enhancement, the threshold value is also set according to a density of the entities of the corresponding category.

This feature further improves the accuracy of the defined threshold value (taking into account how many entities are available for performing the corresponding task).

In a more sophisticated implementation, each threshold value is updated according to a movement speed of the device (estimated from a further set of preceding positions thereof).

In this way, the solution self-adapts to the actual condition of the user (for example, taking into account whether s/he is moving on foot or by car).

In a different embodiment of the invention, appointments (associated with a corresponding time and with one or more locations) are defined; eligible tasks are then selected (and notified to the user) according to their distance from an expected traveling path of the user, which path is determined from the locations of the appointments to be attended in a selected time interval (for example, today).

This solution is very useful for planning the tasks to be performed by the user.

Particularly, the user can also define her/his journeys (each one including one or more appointments to be attended in a selected period); in this case, the time interval is set to the period of an approaching journey.

As a result, the user can advantageously organize the tasks to be performed while away.

Preferably, the above-described operations are executed in response to an activation of the device (for example, when an alarm goes off); in this case, any prerequisite of the eligible tasks is also reminded to the user.

This allows the user to check all the prerequisites that are required for the tasks being planned for the time interval (for example, before leaving home); therefore, the risk of forgetting some prerequisite is strongly reduced (if not avoided at all).

As a further enhancement, any prerequisites that have not been fulfilled are reminded again as soon as the device exits an activation area (for example, home).

The proposed feature provides a further check, which substantially prevents forgetting the necessary prerequisites.

Another aspect of the present invention provides a method for deploying a corresponding service.

A further aspect of the present invention provides a computer program for performing the above-described method.

A still further aspect of the invention provides a program product embodying this computer program.

A different aspect of the invention provides a corresponding data processing system.

Another aspect of the invention provides a mobile data processing device for use in this system.

The characterizing features of the present invention are set forth in the appended claims. The invention itself, however, as well as further features and advantages thereof will be best understood by reference to the following detailed description, given purely by way of a nonrestrictive indication, to be read in conjunction with the accompanying drawings.

DETAILED DESCRIPTION OF THE PREFERRED EMBODIMENT(S)

Figure 1:
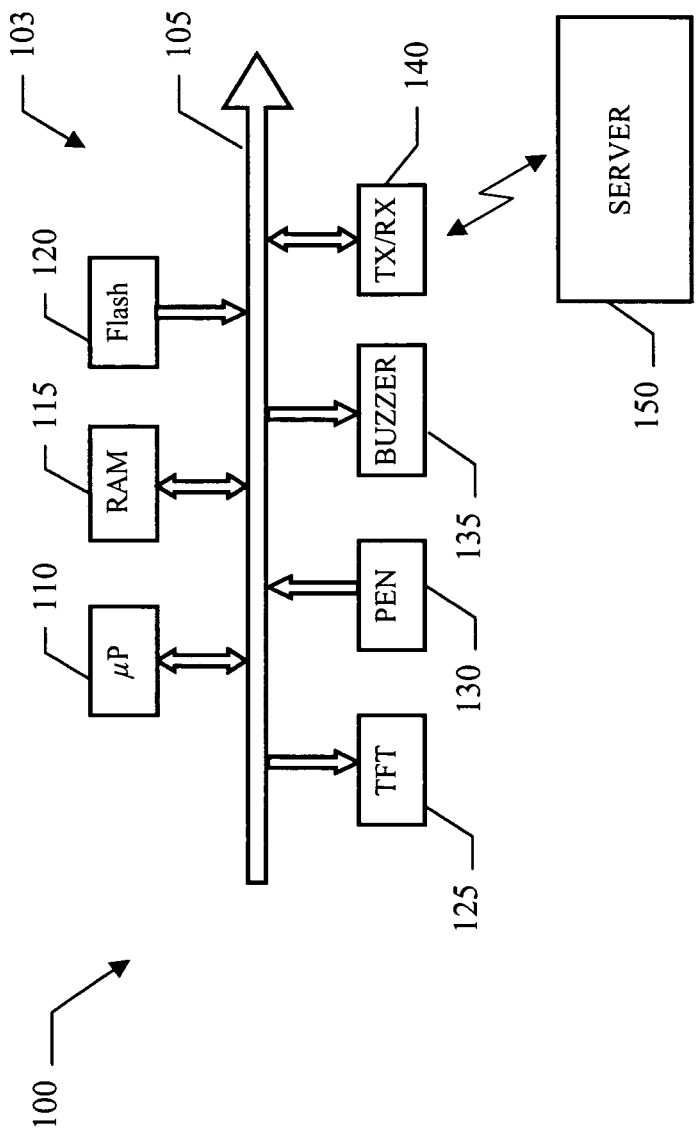
FIG. 1 is a schematic block diagram of a data processing system in which the solution according to an embodiment of the invention is applicable.

With reference in particular to FIG. 1, a data processing system 100 illustrated. The system 100 is based on an organizer 103; the organizer 103 consists of a small electronic device, which provides computing and storage capabilities for performing specific personal activities of a corresponding user.

The organizer 103 is formed by several units that are connected in parallel to a communication bus 105. In detail, a microprocessor (μP) 110 controls operation of the organizer 103. A RAM 115 is used as a working memory by the microprocessor 110, while a solid-state mass memory 120 (for example, consisting of a flash $E^2PROM$) stores information that must be preserved even when a power supply is off (such as a control program and persistent data). Several peripheral units are further connected to the bus 105 by means of respective interfaces. For example, the organizer 103 includes a TFT display 125, and an electronic pen (or stylus) 130 for entering commands and handwritten text. A buzzer 135 is used to emit several acoustic warnings (for example, with different sounds). A Transceiver (TX/RX) 140 allows implementing a wireless connection with a server 150 (through a network, typically consisting of the Internet).

Figure 2:
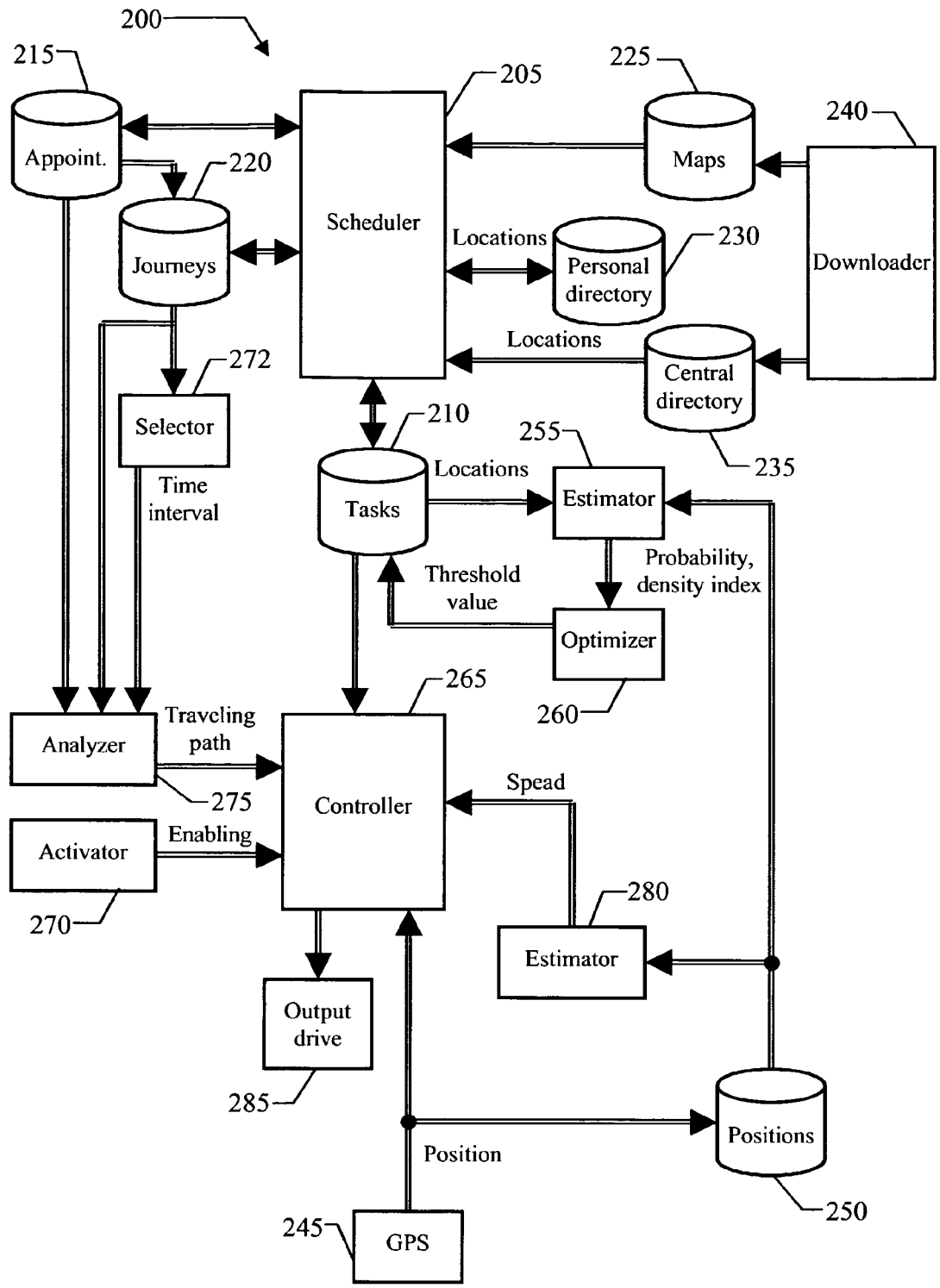
FIG. 2 depicts the main software components that can be used for practicing the solution according to an embodiment of the invention.

Moving now to FIG. 2, the main software components that run on the organizer are denoted as a whole with the reference 200. The information (programs and data) is typically stored on the flash $E^2PROM$ and loaded (at least partially) into the working memory of the organizer when the programs are running, together with an operating system and other application programs (not shown in the figure).

As far as the present invention is concerned, the core module of the organizer consists of a scheduler 205. The scheduler 205 allows the user to define, edit, view, and perform any other management actions relating to tasks, appointments and journeys. The definition of the tasks, appointments and journeys are stored in corresponding files 210, 215 and 220, respectively.

Particularly, each task consists of an activity that may be done at any time; typically, the task must be completed within a defined deadline (which can be either strict or loose). The task must be performed at one or more specific locations. An area is also defined around each location of the task according to a corresponding threshold value; said area consists of a circle centered on the location and having a radius equal to the threshold value. Moreover, the task often requires the fulfillment of one or more prerequisites for its execution; the prerequisites can be of the physical type (i.e., consisting of objects to be carried), of the logical type (i.e., consisting of information to be available), of the attachment type (i.e., consisting of files to be loaded in the organizer), of the activity type (i.e., consisting of other tasks to be performed), and so on.

An example of task is changing the residence of the user, which task must be performed by the end of the year (in order not to loose a corresponding tax exemption); for this purpose, the user must go to a specific public office with a copy of the rental contract (physical prerequisite). A further example is questioning a telephone bill (within two months from its issue date); the task must be performed at the telephone company and requires the knowledge of a customer number of the user (information prerequisite). A still further example is preparing a personalized cheers card for the birthday of a nephew of the user (at a printing shop); in this case, it is necessary to buy the cheers card (activity prerequisite), and then go to the printing shop with a digital picture of the nephew (attachment prerequisite).

On other end, each appointment consists of an activity to be done at a definite time; in some cases, the appointment also has an expected duration. In this case as well, the appointment is arranged at a specific location. Examples of appointments are a business meeting, a medical check, a dinner with friends, and the like.

At the end, each journey consists of the traveling from one place to another over a certain period. The journey is defined by a sequence of appointments being logically grouped (which appointments are specified in the corresponding file 215). An example of journey involves spending a whole week away; during this week, the user will meet with several clients (during the first five days) and then will visit some archeological sites (during the last two days); it should be noted that all the activities of the journey are defined by corresponding appointments (even when they do not relate to an actual appointment in the strict sense of the word, but simply specify an activity planned for a period without any real time-constraint).

In order to define the locations of the above-described activities (tasks, appointments, and journeys), the scheduler 205 accesses a series of maps 225; each map 225 provides a digital representation of an area of interest (with a desired resolution). In this case, each location is directly defined by a pair of spatial coordinates (latitudes and longitudes). The scheduler 205 also controls a personal directory 230. The personal directory 230 consists of an alphabetical list of nicknames, each one identifying a specific entity (such as a person, a shop, an office, and the like); for each entity, the personal directory 230 provides an address (for its location) and other information (for example, a telephone number, an e-mail address, and the like). Moreover, the scheduler 205 accesses a central directory 235. The central directory 235 likewise lists multiple categories of entities (such as pharmacies, banks, post offices, hospitals, plumbers, and the like). For each category, the central directory 235 provides the corresponding entities in an area of interest; as in the preceding case, each entity is associated with a corresponding address (for its location) and other information (for example, a telephone number, a web site, the opening hours, and the like). The maps 225 and the central directory 235 are maintained up-to-date by a module 240, which downloads them from the Internet.

The organizer further includes a position detector 245 based on the Global Positioning System (GPS) technology. The GPS detector 245 determines a position of the organizer (defined by the corresponding spatial coordinates) with an accuracy of a few tens of meters. Some of the detected positions (such as one every 10-30 minutes) are stored into a log 250; in this way, the position log 250 traces the movement of the organizer in a preceding period (for example, the last 2-12 weeks).

An estimator 255 accesses the task file 210 and the position log 250. The estimator 255 calculates a probability of passing in the area around each location (associated with the tasks defined in the file 210) according to the preceding positions of the organizer (stored in the log 250); for example, the probability is obtained dividing the number of preceding positions inside a default area around the location (defined by a predefined threshold value) by the total number of preceding positions. At the same time, the estimator 255 calculates a density (in the area of interest) of the entities for each category associated with the tasks (as listed in the corresponding file 210); for example, the density is defined by an index (such as from 0 to 2), which is obtained dividing the number of entities for the task by a normalization factor. The estimator 255 supplies the probability and the density index to an optimizer 260. For each location of the tasks defined in the file 210, the optimizer 260 sets the threshold value (defining the area around it) according to the corresponding probability and/or density index. For example, the threshold value is obtained starting from a maximum allowable value (such as 1-10 Km), which is divided by the probability and the density index (when available). In this way, the threshold value increases as the probability and/or the density decreases and vice-versa. This means that the area around the corresponding location is larger when the user is unlike to pass close to it or when it is difficult to find the desired entities; conversely, the area is smaller when the user passes often around the location or many entities for the category at issue are available. The threshold values so obtained are then stored into the task file 210.

The organizer further includes a controller 265, which receives the position of the organizer from the GPS detector 245. The controller 265 also receives an enabling signal from an activator 270. A selector 272 accesses the journey file 220, in order to determine a time interval for an analyzer 275; for example, the time interval is set to the duration of a journey to be taken by the user in the next day(s), or it is set from now to the end of the day when no journey is planned for today. The analyzer 275 further accesses the appointment file 215 and the journey file 220; the analyzer 275 determines an expected traveling path of the user in the selected time interval, according to the appointments that have been arranged for this time interval (in both the files 215 and 220). The analyzer 275 returns the traveling path so obtained to the controller 265. The position log 250 is also accessed by another estimator 280. The estimator 280 calculates a speed of the organizer according to its previous positions; for example, the speed is obtained by averaging a set of basic speeds, each one calculated dividing the gap covered between a pair of adjacent preceding positions by the corresponding elapsed time. The speed so obtained is likewise returned to the controller 265. As it will be apparent in the following, the controller 265 determines the tasks that might be performed at the moment (according to the position of the organizer) or during the selected time interval (according to the traveling path); corresponding information is then supplied to the user by means of an output drive 285 (controlling the TFT display and the buzzer of the organizer).

Figure 3A:
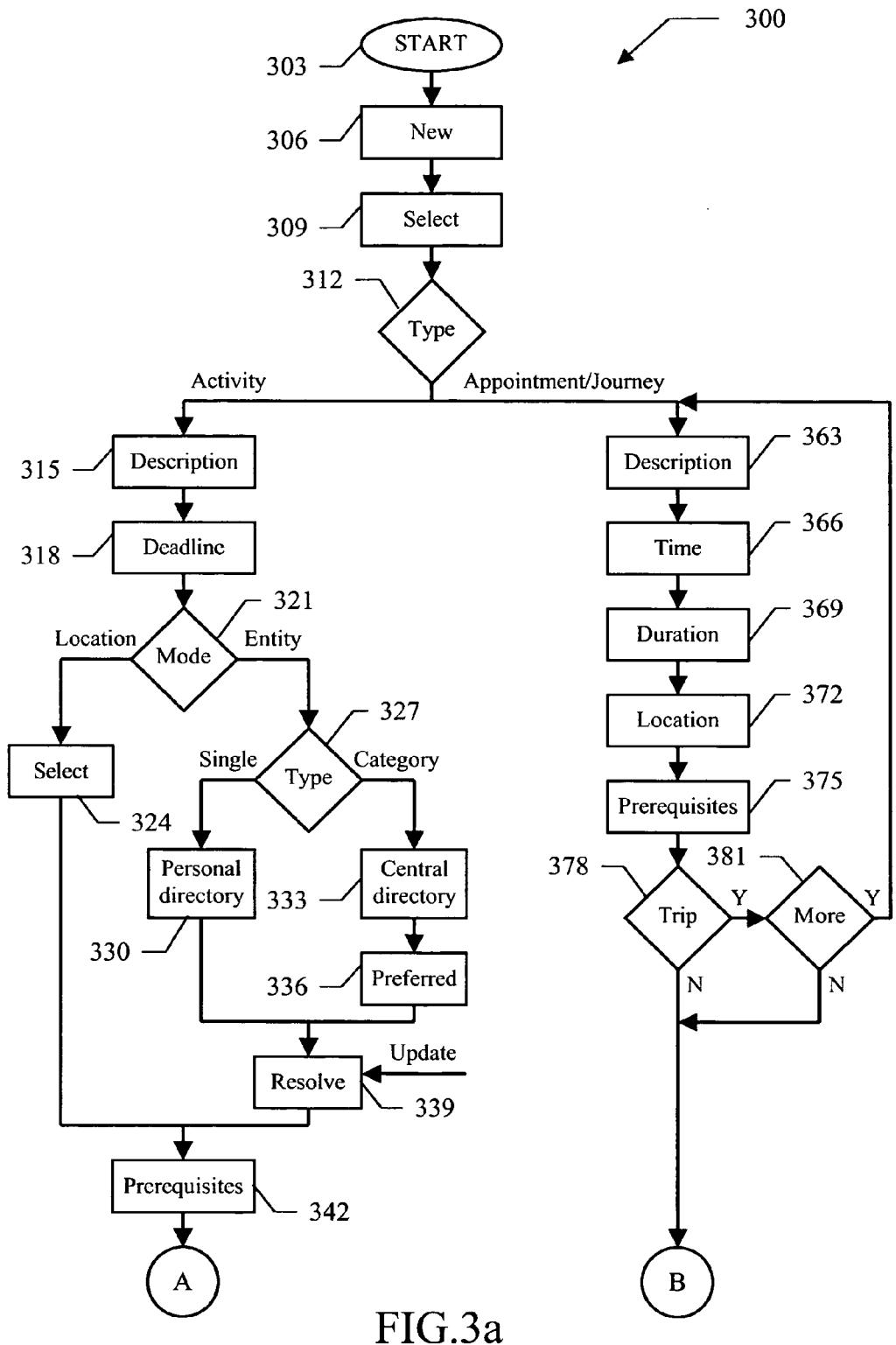
FIGS. 3a-3b show a flow chart describing an exemplary definition of activities in an organizer.
Figure 3B:
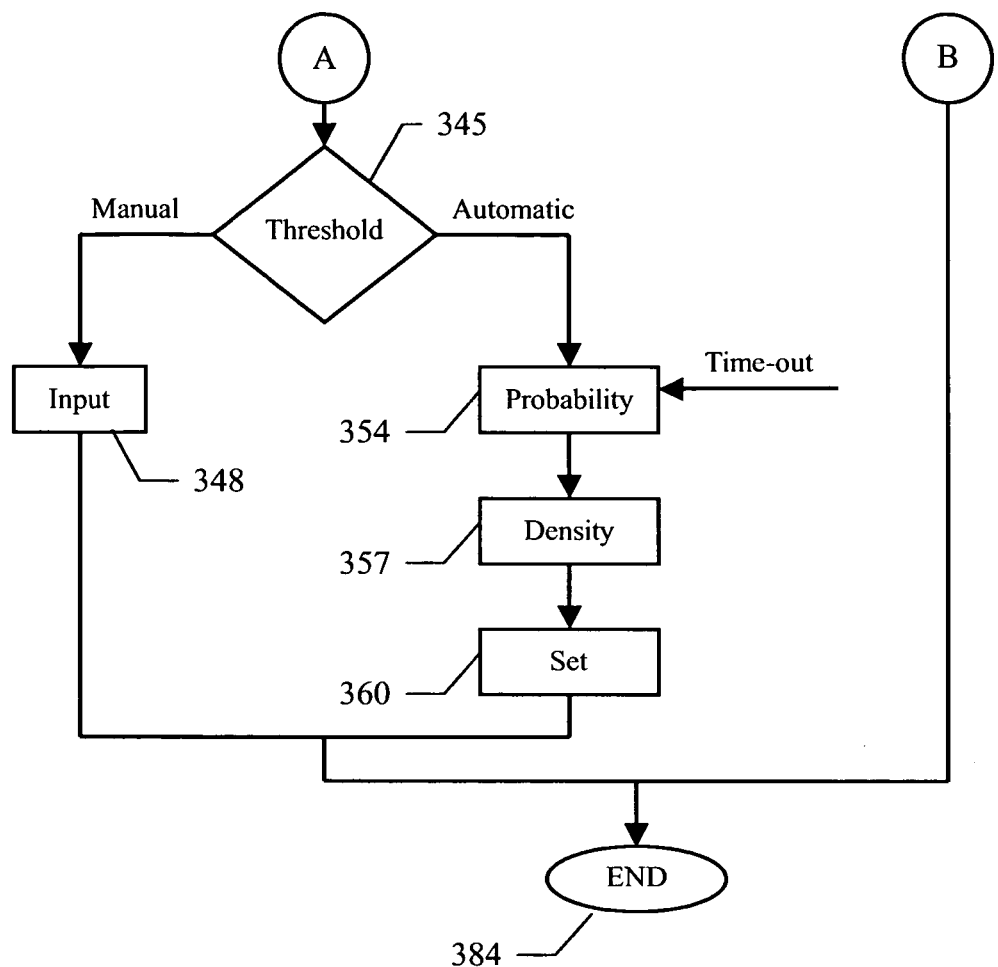

Considering now FIGS. 3a-3b, the logic flow of the operations that are executed for defining the activities in the organizer is represented with a method 300. The method begins at the start block 303, and then passes to block 306 wherein a new activity is created. Continuing to block 309, the user selects the desired type of activity (task, appointment or journey). The flow of activity then branches at block 312 according to the selected type of activity. Particularly, if the user desires to define a new task the blocks 315-360 are executed, whereas is the user desires to define a new appointment/journey the blocks 363-381 are executed; in both cases, the method then ends at the final block 384.

Considering now block 315 (new task), the user enters a corresponding description (typically in the text form). The method then passes to block 318, wherein the user can define the deadline of the task. Considering now decision block 321, if the user decides to specify the location of the task directly the block 324 is executed, whereas if the user decides to specify the location of the task through an entity or a category of entities the blocks 327-339 are executed; in both cases, the method then continues to block 342 (described in the following).

With reference in particular to block 324 (location defined directly), the user selects one of the maps and then chooses a point on it; the spatial coordinates of the selected point then define the desired location. Conversely (location defined by the entity/category), the flow of activity branches at block 327 according to whether the user desires to define the location through an entity or a category of entities. In the first case, the user selects the desired entity at block 330 in the personal directory. In the other case, the user selects the desired category at block 333 in the central directory; moreover, the user at block 336 can also specify one or more of the entities of the selected category as preferred. In both cases, the method joints at block 339. In this phase, the task is associated with the address of the selected entity or with the address of each entity of the selected category (as defined in the personal directory or in the central directory, respectively); those addresses are then resolved into the corresponding spatial coordinates, which define the desired location(s). The same operations are also performed for the relevant outstanding tasks in the corresponding file whenever the personal directory and/or the central directory are updated.

Considering now block 342, the user can define any prerequisite that is required by the task (if it is necessary). The flow of activity then branches again at block 345 according to the mode that has been set for defining the threshold value (defining the area around each location associated with the task). Particularly, if the user desires to enter the threshold value manually the operation is performed directly at block 348; the method then ends at the final block 384. Conversely, if the threshold value must be calculated automatically the probability of passing in the default area around each location associated with the task is calculated at block 354 (according to the preceding locations stored in the corresponding log); the same point is also reached whenever a predefined time-out expires (for example, every 10-20 days), so as to refresh all the threshold values previously determined as the relevant conditions change. Proceeding to block 357, if the task is associated with multiple locations (i.e., it has been defined through a category of entities), the corresponding density index is calculated. With reference now to block 360, the threshold value for each location is calculated (as a function of the probability and/or of the density index); the method then ends at the final block 384.

Considering instead block 363 (new appointment or journey), a corresponding description is entered by the user. The method then passes to block 366, wherein the time of the desired appointment or of the first one of the journey is defined. Passing to block 369, it is also possible to specify the expected duration of the appointment. The location of the appointment is then selected at block 372 (by repeating the same operations described above with reference to blocks 321-339). If necessary, the user can also define any prerequisite that is required by the appointment at block 375. The flow of activity then branches at block 378 according to whether the user is defining a (single) appointment or a journey. In the first case, the method descends into the final block 384 directly. On the contrary, a test is made at block 381 to determine whether the definition of the journey is complete. If so, the method ends at the final block 384 as well. Conversely, the flow of activity returns to block 363 for defining a further appointment of the journey.

Figure 4A:
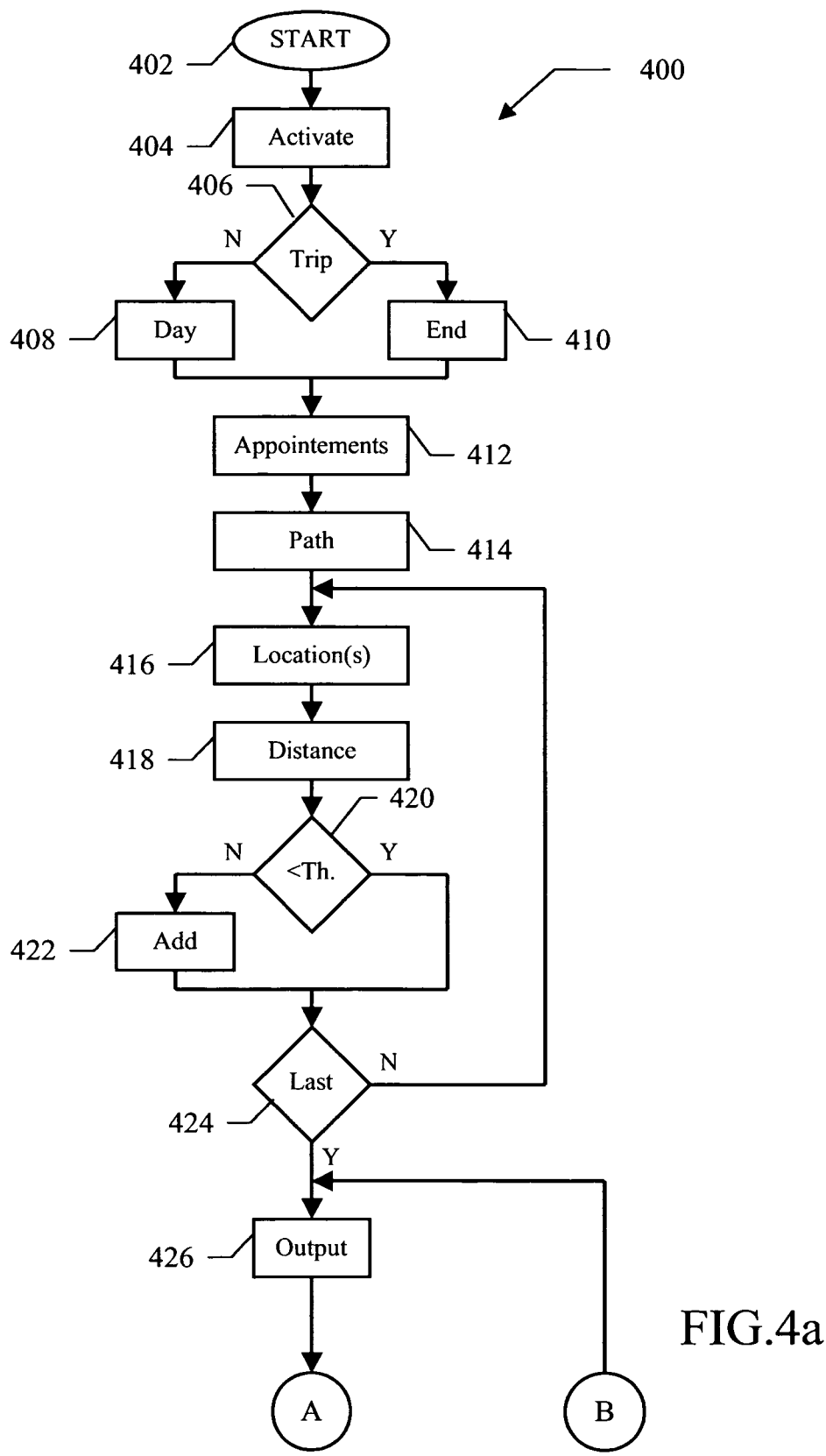
FIGS. 4a-4c show a further flow chart describing the management of tasks defined in the organizer according to an embodiment of the invention.
Figure 4B:
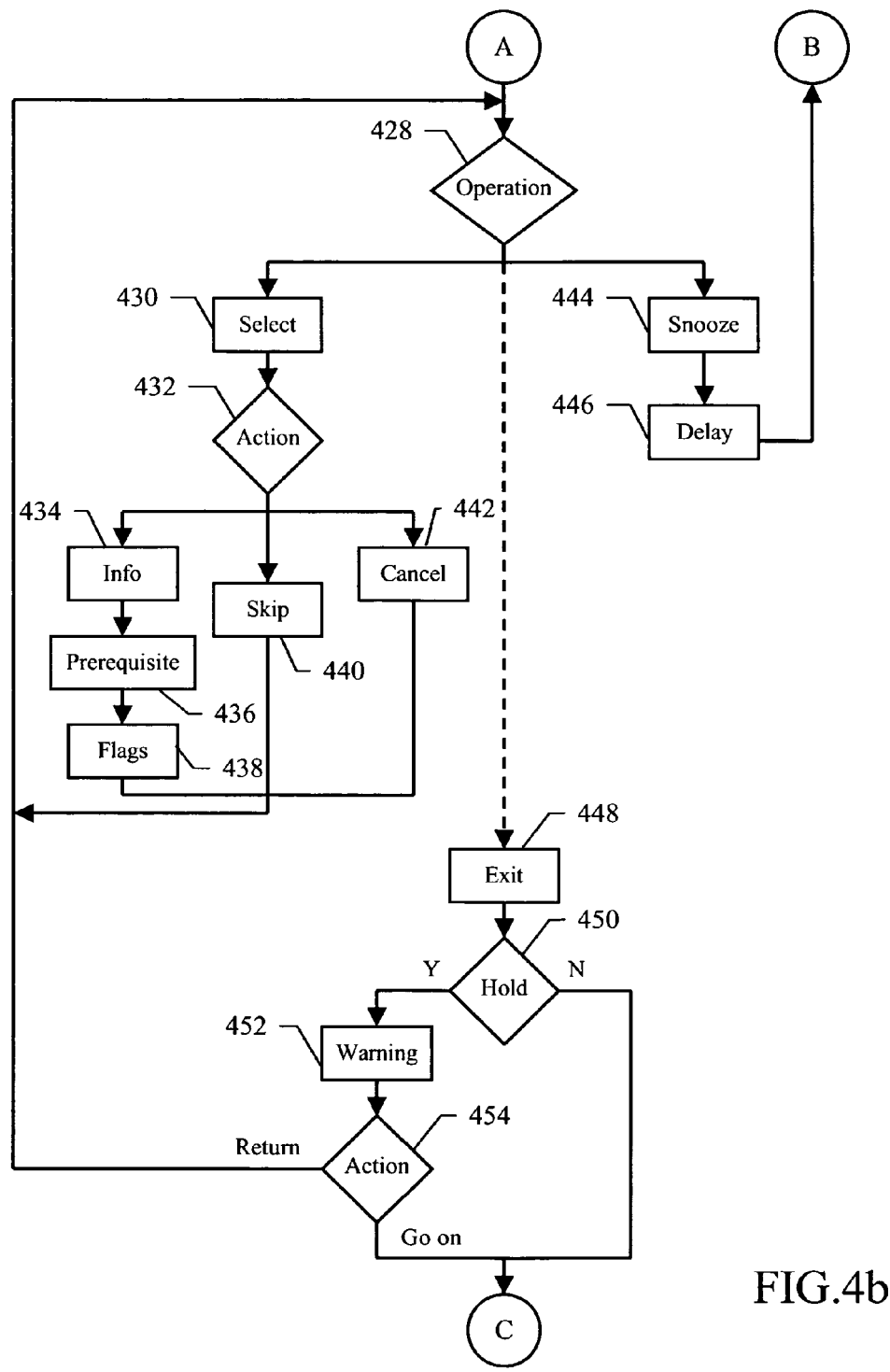
Figure 4C:
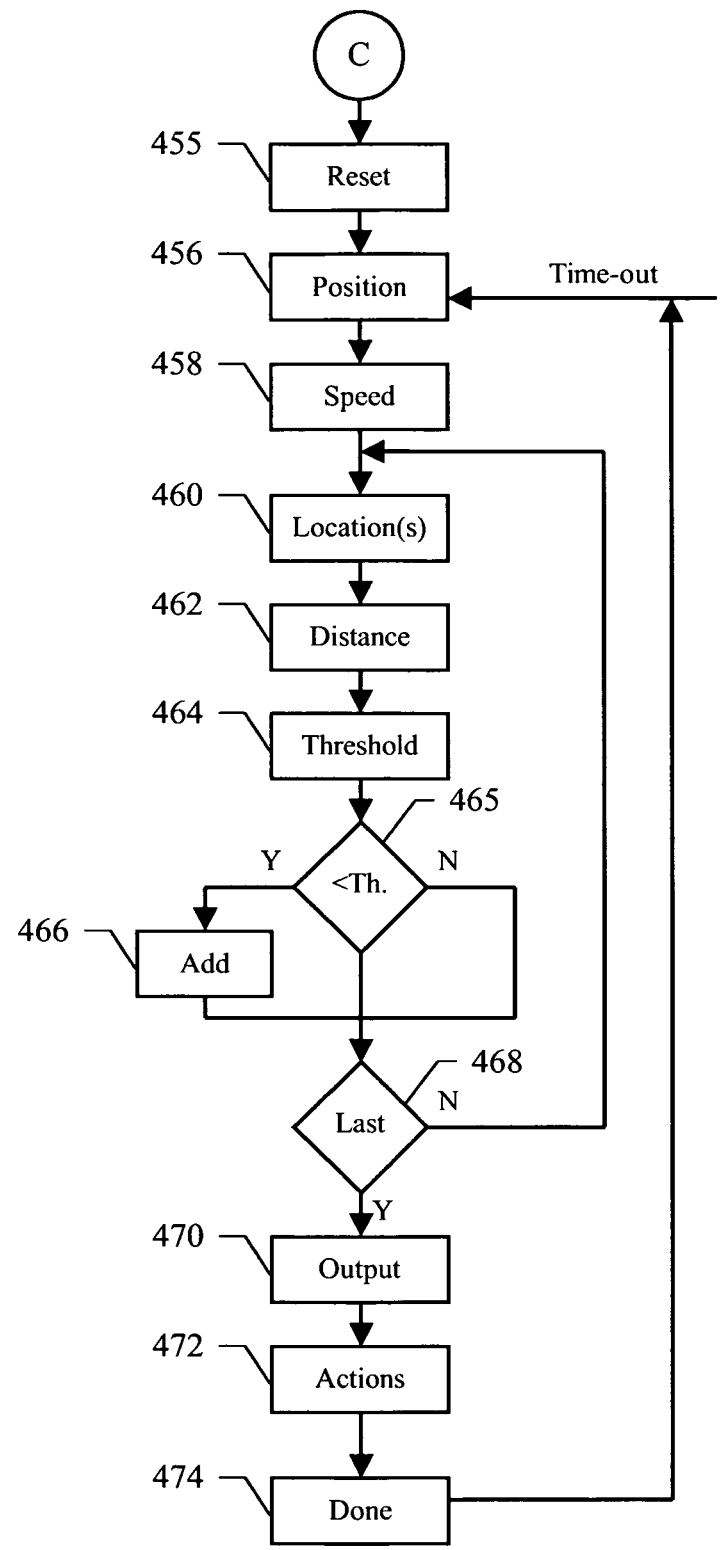

Moving now to FIGS. 4a-4c, the management of the tasks defined in the organizer implements a further method 400. The method begins at the start block 402, and then passes to block 404 wherein the organizer is activated (for example, when it is turned-on or an alarm wakes up the user in the morning). The controller is then enabled by the corresponding signal provided by the activator; in response thereto, a test is made at block 406 to determine whether any journey is planned starting from today. If not, the time interval for defining the traveling path is set from now to the end of the day at block 408; conversely, the same time interval is set from now to the end of the approaching journey(s) at block 410. In both cases, the method passes to block 412, wherein the appointments that have been defined for said time interval are extracted from the respective file and inserted into a list of eligible activities. Descending into block 414, the expected traveling path of the user in the time interval is determined according to the locations of those appointments.

A loop is then performed for each task defined in the corresponding file (starting from the first one); the loop begins at block 416, wherein the location(s) associated with the task are extracted from its definition. Proceeding to block 418, a distance of each location of the task from the traveling path is calculated. The distance is then compared with the threshold value associated with the location at block 420. If at least one distance is lower than the corresponding threshold value (meaning that the user is expected to pass in the area around the location), the task is added to the list of eligible activities at block 422; the method then descends into block 424. The same point is also reached from block 420 directly when the distance is higher than the threshold value. A test is then made at block 424 to determine whether all the tasks have been processed. If not, the flow of activity returns to block 416 for reiterating the same operations with respect to a next task. Conversely, the method exits the above-described loop and passes to block 426. In this phase, the buzzer is actuated (to warn the user) and the list of eligible activities (tasks and/or appointments) is shown on the TFT display.

The flow of activity then branches at block 428 according to the operation selected by the user. Particularly, if the user decides to process the eligible activities the blocks 430-442 are executed, whereas if the user decides to postpone them the blocks 444-446 are executed.

Considering now block 430 (processing), the user selects one of the eligible activities. Different actions are then performed according to the choice of the user (decision block 432). Particularly, is the user wishes to analyze the eligible activity the blocks 434-438 are executed, if the used desires the skip the eligible activity the block 440 is executed, and if the user desires to cancel the eligible activity the block 442 is executed; in any case, the method then returns to block 428.

With reference in particular to block 434 (analyzing), the information available for the eligible activity is retrieved from the relevant file and displayed (for example, specifying its description, deadline or time, and locations). Continuing to block 436, the associated prerequisites (if any) are likewise retrieved and displayed. For each prerequisite, the user at block 438 can fulfill it and then thick a corresponding flag (for example, when an object to be carried has been taken, when a required information item has been obtained, or when a necessary file has been loaded). On the other end, when the user has chosen to skip the eligible activity (block 440), this activity is removed from the list (for example, because a task cannot be performed in the specific time interval for whatever reason). At the end, the user can cancel the eligible activity from the corresponding file (block 442); for example, this happens when a task has already been completed, the task is not necessary any longer, or an appointment has been canceled.

Considering instead block 444, the user can postpone all the eligible activities according to a selected delay (for example, allowing her/him to have breakfast). In this case, the method waits for the selected delay at block 446; the flow of activity then returns to block 426 (for warning the user again) when the delay has expired.

In a completely asynchronous way, the method descends into block 448 as soon as the user exits home; for example, this event is detected when a distance of the organizer from a position registered at its activation exceeds a predefined offset (such as 30-50 m). A test is then made at block 450 to determine whether one or more prerequisites of the eligible activities have not been fulfilled yet (as indicated by the corresponding flags). If so, the buzzer of the organizer is actuated at block 452 for warning the user that some prerequisites have been forgotten. If the user decides to return home (block 454), the flow of activity goes back to block 428 for repeating the operations described above. Conversely, the method descends into block 455 wherein the list of eligible activities is reset; the same point is also reached from block 450 directly when all the prerequisites for the eligible activities are fulfilled.

Considering now block 456, the organizer detects its position continually (whenever a corresponding time-out expires, for example, every 10-60 seconds). Proceeding to block 458, the current speed of the organizer is calculated according to its previous positions.

A loop is then performed for each task defined in the corresponding file (starting from the first one); the loop begins at block 460, wherein the location(s) associated with the task are extracted from its definition. Proceeding to block 462, a distance of each location of the task from the position of the organizer is calculated. The method then passes to block 464, wherein the threshold value associated with the location is retrieved and updated according to the speed of the organizer. For example, the threshold value is multiplied by an index (such as from 0 to 2), which is obtained dividing the speed by a normalization factor; in this way, it is possible to reduce the threshold value when the user is moving slow (for example, on foot) or to increase it when the user is moving fast (for example, by car). The distance is then compared with the (updated) threshold value at block 465. If at least one distance is lower than (or equal as) the corresponding threshold value (meaning that the user is in the area around the location), the task is added to the list of eligible activities at block 466; the method then descends into block 468. The same point is also reached from block 465 directly when the distance is higher than the threshold value. A test is then made at block 468 to determine whether all the tasks have been processed. If not, the flow of activity returns to block 460 for reiterating the same operations with respect to a next task. Conversely, the method exits the above-described loop and passes to block 470. In this phase, the buzzer is actuated and the list of eligible activities (tasks) is displayed. Continuing to block 472, the user can process the eligible tasks repeating the operations described above with reference to blocks 430-442. Assuming that one or more eligible tasks are performed, they are deleted from the respective file at block 474. The flow of activity then returns to block 456 for repeating the same operations described above as soon as the corresponding time-out expires (until the organizer is turned off).

Figure 5A:
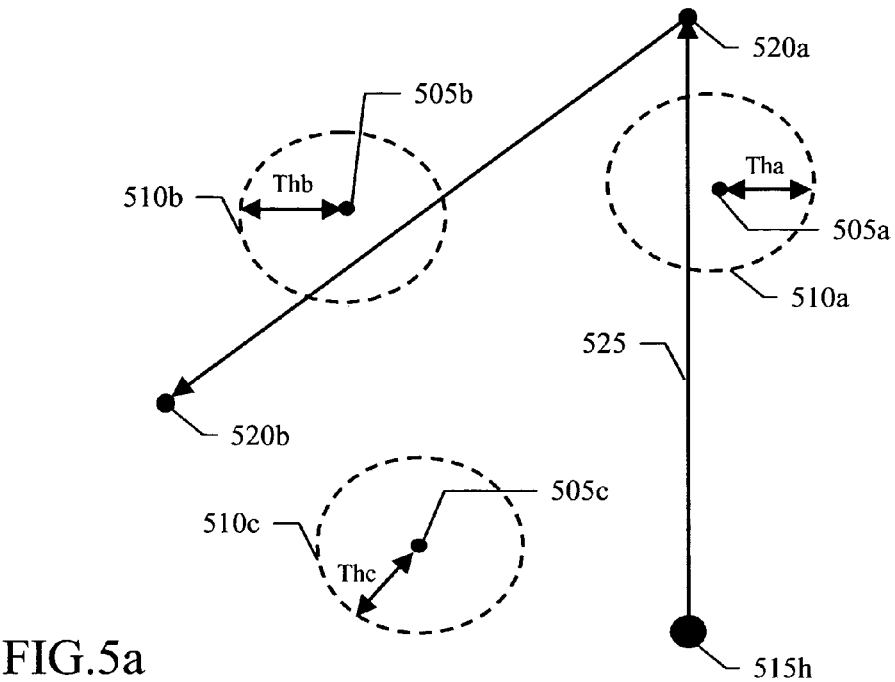
FIGS. 5a-5b are illustrative representations of exemplary scenarios relating to different embodiments of the invention.
Figure 5B:
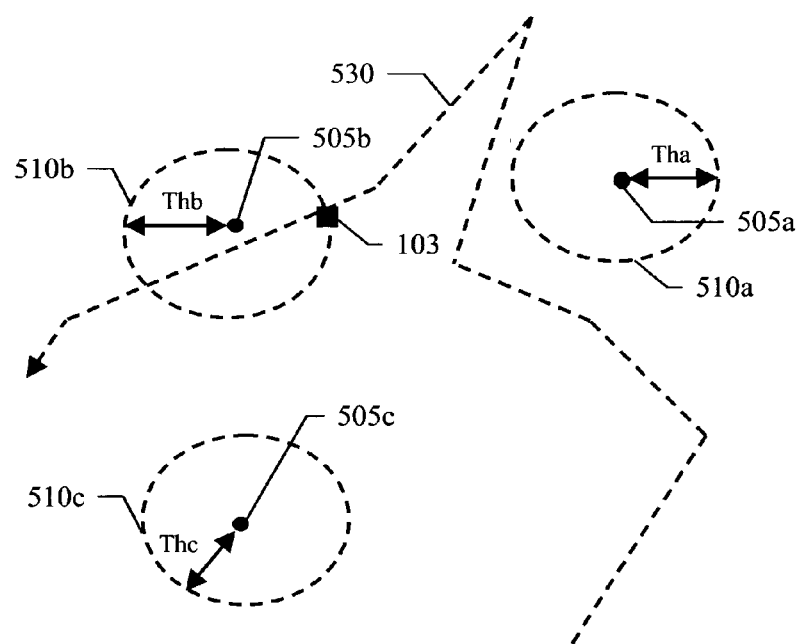

Exemplary scenarios relating to the above-described operations are illustrated in FIGS. 5a-5b. Considering in particular FIG. 5a, the locations of three tasks defined in the organizer are denoted with 505a, 505b and 505c. The corresponding threshold values Tha, Thb and Thc identify the areas around them 510a, 510b and 510c, respectively. During the day, the user is expected to travel from home (515h) to the locations 520a and 520b for corresponding appointments. This provides a traveling path 525. As can be seen, the traveling path 525 crosses the areas 510a and 510b. As a result, the user will be warned by the organizer that today s/he will be close to the locations of the corresponding tasks; therefore, if the user wishes to perform some of these tasks, s/he can verify whether the corresponding prerequisites have been fulfilled (before leaving home).

Likewise, FIG. 5b traces the actual movements of the user during the day (arrow 530). As soon as the organizer 103 enters the area around a specific location of a task (the area 510a in the example at issue), the organizer 103 promptly warns the user. Therefore, the user can take advantage of the fact of being close to the location for performing the task with the minimum waste of time.

Modifications

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent elements. Likewise, the organizer can have other peripheral units (such has an IrDA port for exchanging information via infrared light waves, a PCMCIA slot, and the like). In any case, the solution according to the present invention leads itself to be implemented with a palmtop (also known as hand-held computer or PDA), with a laptop, with a telephone, or more generally with any other mobile data processing device.

It should also be noted that in a different embodiment of the invention the above-described operations are controlled by a central server, which provides a corresponding service. More in detail, the server detects when the device is turned-on and then continually tracks its position; in this way, the server can perform all the operations required to implement the proposed solution, and then notify the user accordingly (assuming that the needed information has been previously uploaded onto the server). This solution is particularly advantageous when the devices have a very low computational power; moreover, its implementation is very simple for mobile telephones (since most information, such as their position, is already available in the server of a telephone company).

Similar considerations apply when the tasks are defined in a different way, or when other signals are used to warn the user. Likewise, the position of the organizer can be detected with any other available technology (for example, through its cell in a mobile telephone system).

It is also possible to resolve each entity or category of entities into the corresponding location(s) in a different way.

Moreover, the eligible tasks to be notified to the user can be selected with another procedure (for example, partitioning an area of interest into sectors, and identifying all the tasks which locations are inside the sector being entered by the user).

Alternatively, it is possible to calculate the probabilities, the densities, and/or the speed with other algorithms (for example, increasing the speed when the organizer is fed by an external power supply source to take into account that the user is probably traveling by car). Likewise, the threshold values can be updated according to those parameters with any other suitable formulas.

Similar considerations apply when the appointments are defined in a different way. Moreover, it is possible to determine the expected traveling path with more sophisticated techniques (for example, taking into account the transport means that will be used). In this case as well, the eligible tasks to be notified to the user can be selected with another procedure; for example, it is possible to limit the search to the tasks which locations are around the ones of the appointments to be attended (disregarding the tasks which locations are along the corresponding movements, such as when the user cannot stop during them).

Likewise, the journeys can be defined in a different way (for example, specifying the corresponding movements). Moreover, the time interval for the selection of the eligible tasks can be set to other values (for example, only according to the next 8-10 hours when no journey is planned for the day).

The operations described above for the morning can also be triggered by other events relating to an activation of the organizer (such as whenever the user exits from her/his office). In any case, the principles of the invention should not be limited to the cited types of prerequisites.

In addition, the exit of the user from the activation area can be detected with other techniques (for example, based on a sniffer that is installed at a door for sensing an RFID label attached to the organizer).

Similar considerations apply if the programs are structured in a different way, or if additional modules or functions are provided; likewise, the memory structures can be of different types, or can be replaced with equivalent entities (not necessarily consisting of physical storage media). Moreover, the proposed solution can be implement with an equivalent method (for example, with similar or additional steps).

In any case, it is possible to distribute the programs in any other computer readable medium (such as a memory key).

Moreover, it will be apparent to those skilled in the art that the additional features providing further advantages are not essential for carrying out the invention, and may be omitted or replaced with different features.

For example, the locations of the tasks can be defined only with the maps, with the personal directory, with the central directory, with any combination thereof, or with other techniques (for example, entering an address that is automatically resolved into the corresponding spatial coordinates, or storing the current position of the organizer).

Simplified implementations wherein the threshold values cannot be defined automatically are contemplated. Alternatively, it is possible to set the threshold values only according to the probabilities, to the densities, or to the speed. In any case, the use of a single predefined threshold value for all the tasks is within the scope of the invention.

Even though in the preceding description reference has been made to the preferred embodiment of the invention with a number of functions, this is not to be intended as a limitation; indeed, an implementation that only supports the notification of the tasks when the user is approaching their locations is not excluded. Vice-versa, it is also possible to have the function reminding the tasks and/or the appointments for the selected time interval only.

The principles of the invention also apply when the organizer does not support the definition of the journeys (or when the journeys are not taken into account for determining the expected traveling path of the user).

It should also be noted that nothing prevents an implementation without the possibility of reminding the prerequisites that have not been fulfilled yet when the user exits the activation area.

Similar considerations apply if the programs are sent to the organizer through the Internet, are broadcast, or more generally are provided in any other form directly loadable into the working memory of the organizer (or of the server).

At the end, the method according to the present invention leads itself to be carried out with a hardware structure (for example, integrated in a chip of semiconductor material), or with a combination of software and hardware.

The invention claimed is:

1. A method for automatically generating a notification based on a probable location of a mobile device, comprising:
   selecting an entity from a plurality of entities based on an eligible task to be performed to form a selected entity;
   calculating a probability of the mobile device passing in a default area around the location associated with the eligible task based on a set of past positions of the mobile device;
   determining an indication of a density of entities in a particular category for the selected entity;
   setting a threshold value defining the area around the location according to the density of the entities in the particular category indication and the probability of the mobile device passing in the default area around the location associated with the eligible task;
   identifying, using a data processor, an area around a location within which a user is to be notified of the eligible task at the location according to the threshold value;
   notifying the user when the mobile device enters the area around the location for the eligible task;
   estimating a movement speed of the mobile device according to a set of preceding positions of the mobile device; and
   adjusting the threshold value defining the area according to the movement speed such that the threshold value is reduced for a relatively slow movement speed and the threshold value is increased for a relatively fast movement speed.

2. The method according to claim 1, further comprising:
   resolving the selected entity to the location to determine a pair of spatial coordinates for the location.

3. The method according to claim 2, wherein the step of resolving the selected entity into the location comprises:
   selecting the particular category for the selected entity from among a plurality of categories of entities maintained in a directory; and
   resolving the particular category to at least one location of each entity in the particular category to determine a pair of spatial coordinates for the at least one location of each entity in the particular category.

4. The method according to claim 1, further including the steps of:
   defining appointments to be attended by the user at particular specified times;
   associating an indication of a time and a further location with each appointment;
   determining an expected traveling path of the user according to the further locations of the appointments to be attended in a selected time interval;
   determining a further area around each further location within which the user is to be notified of a further eligible task;
   responsive to the expected traveling path of the user crossing a respective further area around a respective further location, selecting each respective further eligible task; and
   notifying the each respective further eligible task to the user.

5. The method according to claim 4, further including the steps of:
defining journeys to be made by the user, each journey including at least one appointment to be attended in a selected period; and
setting the time interval to the selected period of an approaching journey.

6. The method according to claim 4, wherein the step of notifying the each respective further eligible task to the user is performed in response to an activation of the mobile device, the method further including:
presenting a notification of the each further eligible task to remind the user to bring an item required to perform the each further eligible task.

7. The method according to claim 6, further including the steps of:
asserting a fulfillment flag for a prerequisite of the further eligible tasks in response to fulfillment of the prerequisite by the user; and
detecting an exit of the mobile device from an activation area when a distance of the mobile device from a position where the activation of the mobile device occurred exceeds a predefined offset.

8. A computer program product stored on a non-transitory computer readable medium, the computer program product comprising:
instructions for selecting an entity from a plurality of entities based on an eligible task to be performed to form a selected entity;
instructions for calculating a probability of a mobile device passing in a default area around the location associated with the eligible task based on a set of past positions of the mobile device;
instructions for determining an indication of a density of entities in a particular category for the selected entity;
instructions for setting a threshold value defining the area around the location according to the density of the entities in the particular category indication and the probability of the mobile device passing in the default area around the location associated with the eligible task;
instructions for identifying an area around a location within which a user is to be notified of the eligible task at the location according to the threshold value;
instructions for notifying the user when the mobile device enters the area around the location for the eligible task;
instructions for estimating a movement speed of the mobile device according to a set of preceding positions of the mobile device; and
instructions for adjusting the threshold value defining the area according to the movement speed such that the threshold value is reduced for a relatively slow movement speed and the threshold value is increased for a relatively fast movement speed.

9. A data processing system for automatically generating a notification based on a probable location of a mobile device, the data processing system comprising:
a bus;
a storage unit connected to the bus in which program instructions are stored; and
a microprocessor connected to the bus and configured to run the program instructions stored in the storage unit to select an entity from a plurality of entities based on an eligible task to be performed to form a selected entity, calculate a probability of the mobile device passing in a default area around the location associated with the eligible task based on a set of past positions of the mobile device, determine an indication of a density of entities in a particular category for the selected entity, set a threshold value defining the area around the location according to the density of the entities in the particular category indication and the probability of the mobile device passing in the default area around the location associated with the eligible task, identify an area around a location within which a user is to be notified of the eligible task at the location according to the threshold value, notify the user when the mobile device enters the area around the location for the eligible task, estimate a movement speed of the mobile device according to a set of preceding positions of the mobile device, and adjust the threshold value defining the area according to the movement speed such that the threshold value is reduced for a relatively slow movement speed and the threshold value is increased for a relatively fast movement speed.

10. The data processing system according to claim 9 wherein the microprocessor further runs the program instructions to resolve the selected entity into the at least one location.

11. The method according to claim 7, wherein the prerequisite is a tangible item defined by the user to be brought to the at least one location.

12. The method of claim 7, further comprising:
responsive to detecting the exit of the mobile device from the activation area and the fulfillment flag not being asserted, notifying the user of the prerequisite.

13. The method of claim 1, further comprising:
associating an indication of a prerequisite with the eligible task, wherein the prerequisite is an item that the user must bring to the location to complete the task; and
responsive to a determination that the user has selected the task, notifying the user that the prerequisite is needed to complete the task.

14. The method of claim 1, wherein the step of calculating the probability comprises:
dividing a number of previously recorded positions of the mobile device that were in a region around the location by a total number of previously recorded positions of the mobile device to form the probability; and wherein the threshold value is set by:
dividing a predetermined maximum value by the probability such that the threshold value increases as the probability decreases and the threshold value decreases as the probability increases.

15. The method of claim 1, wherein the mobile device notifies the user and comprises the data processor.

16. A computer implemented method for automatically generating multiple notifications to a user based on expected and actual positions of a mobile device, comprising computer performed steps of:
for each appointment in a list of appointments:
determining an expected travel path for a given appointment at a given location associated with a given task,
calculating a distance of the given location from the expected travel path,
selecting an entity from a plurality of entities based on an eligible task to be performed to form a selected entity,
calculating a probability of the mobile device passing in a default area around the given location based on a set of past positions of the mobile device,
determining an indication of a density of entities in a particular category for the selected entity,
setting a threshold value defining an area around the given location according to the density of the entities in the particular category indication and the probability of the mobile device passing in the default area around the given location, determining if the distance of the given location from the expected travel path is less than the threshold value, responsive to determining that the distance of the given location from the expected travel path is less than the threshold, adding the given task to a list of eligible activities, and notifying the list of eligible activities to the user;

detecting an exit of the mobile device from an activation area when an exit distance of the mobile device from a position where an activation of the mobile device occurred exceeds a predefined offset;

responsive to detecting the exit of the mobile device, performing, for each task in a list of tasks, steps of:

monitoring a position of the mobile device, and notifying the user when the mobile device enters the area around the given location associated with the given task;

estimating a movement speed of the mobile device according to a set of preceding positions of the mobile device; and adjusting the threshold value defining the area according to the movement speed such that the threshold value is reduced for a relatively slow movement speed and the threshold value is increased for a relatively fast movement speed.

17. The method of claim 16, further comprising:

associating an indication of a prerequisite with the given task, wherein the prerequisite is an item that the user must bring to the given location to complete the given task; and responsive to a determination that the user has selected the given task, notifying the user that the prerequisite is needed to complete the given task.

* * * * *